US008694253B2

(12) United States Patent  (10) Patent No.: US 8,694,253 B2
Fino                        (45) Date of Patent:    Apr. 8, 2014

(54) USER-SPECIFIED ROUTE RATING AND ALERTS

(75) Inventor: Jorge S. Fino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 20 days.

(21) Appl. No.: 13/339,281

(22) Filed: Dec. 28, 2011

(65) Prior Publication Data

US 2013/0173155 A1    Jul. 4, 2013

(51) Int. Cl.
    *G01C 21/34* (2006.01)
(52) U.S. Cl.
    USPC ............................................. 701/533
(58) Field of Classification Search
    USPC ................................................. 701/533
    See application file for complete search history.

(56) References Cited

U.S. PATENT DOCUMENTS

| 6,587,785 | B2 * | 7/2003 | Jijina et al. ............. 701/414 |
| 6,631,184 | B1 * | 10/2003 | Weiner ................ 379/92.01 |
| 7,512,487 | B1 * | 3/2009 | Golding et al. ........... 701/424 |
| 7,844,482 | B1 * | 11/2010 | Larson ................... 705/7.31 |
| 7,957,895 | B2 * | 6/2011 | Haase .................... 701/426 |
| 8,180,558 | B1 * | 5/2012 | Marko .................... 701/119 |
| 8,200,431 | B2 * | 6/2012 | Lin ....................... 701/533 |
| 8,219,316 | B2 * | 7/2012 | Goel ..................... 701/422 |
| 8,255,158 | B2 * | 8/2012 | O'Neill .................. 701/465 |
| 8,346,224 | B2 * | 1/2013 | Jahr .................... 455/414.1 |
| 8,370,190 | B1 * | 2/2013 | Larson ................... 705/7.32 |
| 2005/0130676 | A1 | 6/2005 | Broussard et al. |
| 2006/0229807 | A1 * | 10/2006 | Sheha et al. ............... 701/209 |
| 2007/0281689 | A1 | 12/2007 | Altman et al. |
| 2008/0009275 | A1 | 1/2008 | Werner et al. |
| 2008/0082254 | A1 * | 4/2008 | Huhtala et al. ............ 701/201 |
| 2008/0132252 | A1 * | 6/2008 | Altman et al. ............ 455/457 |
| 2008/0147773 | A1 * | 6/2008 | Aaron .................... 709/201 |
| 2009/0005964 | A1 * | 1/2009 | Forstall et al. ............ 701/201 |
| 2009/0005965 | A1 * | 1/2009 | Forstall et al. ............ 701/201 |
| 2009/0005975 | A1 * | 1/2009 | Forstall et al. ............ 701/209 |
| 2009/0027223 | A1 | 1/2009 | Hill |
| 2009/0177386 | A1 * | 7/2009 | Haase .................... 701/209 |
| 2011/0288911 | A1 | 11/2011 | Barnes, Jr. |
| 2012/0041672 | A1 * | 2/2012 | Curtis et al. .............. 701/426 |
| 2012/0303273 | A1 * | 11/2012 | Su et al. ................. 701/533 |
| 2013/0018574 | A1 * | 1/2013 | Adler .................... 701/408 |

FOREIGN PATENT DOCUMENTS

EP          1 439 373        7/2004

OTHER PUBLICATIONS

International Search Report and Written Opinion of the International Searching Authority, PCT Application Serial No. PCT/US2012/058073, May 23, 2013, 15 pp.

* cited by examiner

*Primary Examiner* — Mary Cheung
*Assistant Examiner* — Anne Mazzara
(74) *Attorney, Agent, or Firm* — Fish & Richardson P.C.

(57) ABSTRACT

In some implementations, a user can provide ratings for routes, streets and/or locations. In some implementations, the user can initiate an alert associated with a location. In some implementations, user-specified ratings and alerts can be included in a route determination. In some implementations, route rating and alert information can be transmitted to other users and/or devices.

21 Claims, 19 Drawing Sheets

USER-SPECIFIED ROUTE RATING AND ALERTS

TECHNICAL FIELD

The disclosure generally relates to navigation and route selection.

BACKGROUND

Navigation systems are commonplace today. Users can access navigation systems online, in cars and in mobile devices that can route a user from one location to another. The routes selected by navigation systems are generally selected based on intrinsic qualities of a route, such as distance, road type, and other features associated with the roads and streets that make up the route.

SUMMARY

In some implementations, a user can provide ratings for routes, streets and/or locations. In some implementations, the user can initiate an alert associated with a location. In some implementations, user-specified ratings and alerts can be included in a route determination. In some implementations, route rating and alert information can be transmitted to other users and/or devices.

Particular implementations provide at least the following advantages: Route determination is improved by accounting for real-world considerations and concerns of travelers. Real-time user-generated alerts allow for faster and more accurate notification of events within proximity of a user that might hinder the user's progress as the user travels.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Routing System Overview

Figure 1:
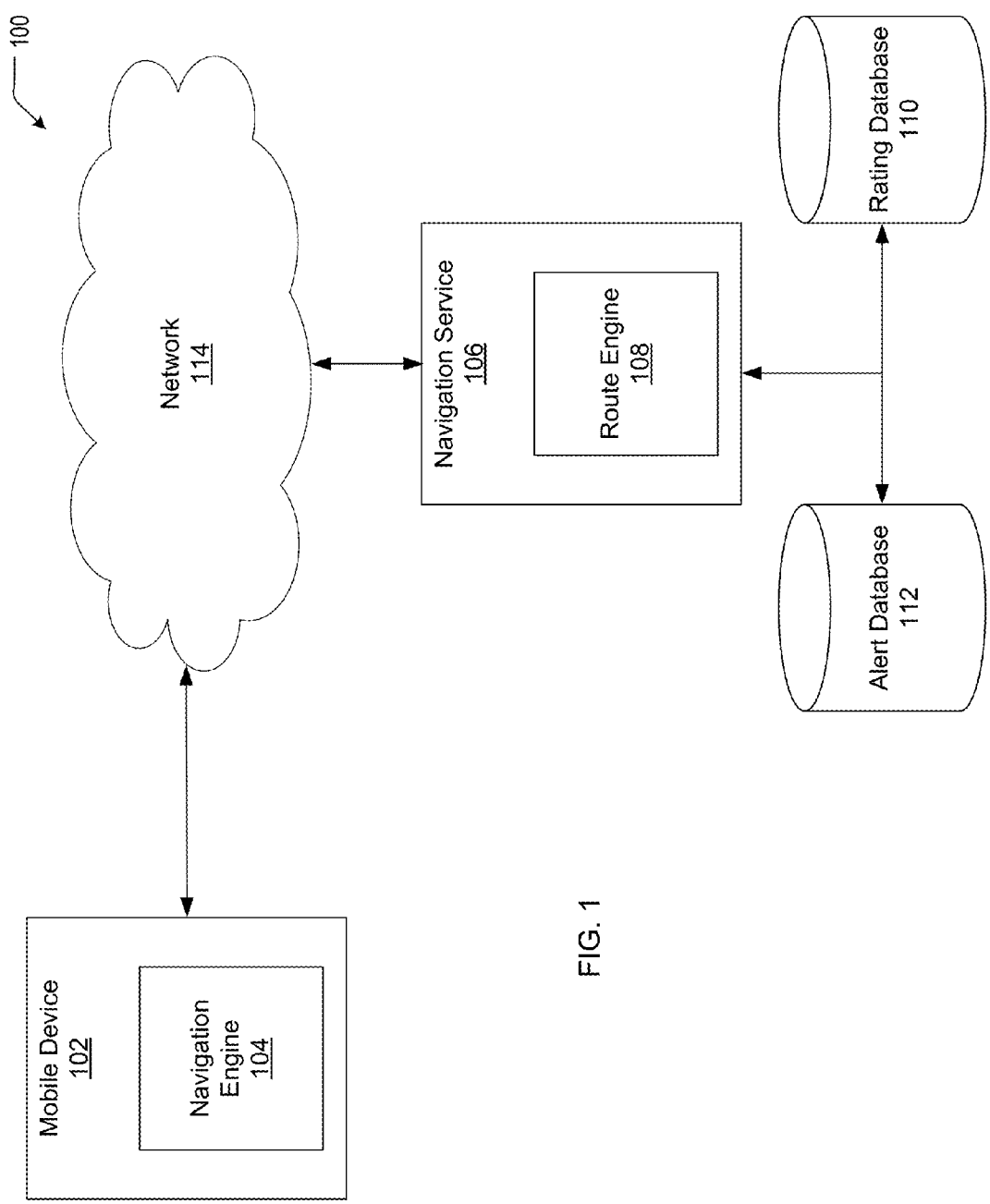
FIG. 1 illustrates an example navigation system for determining routes based on user-specified route ratings and alerts.

FIG. 1 illustrates an example navigation system 100 for determining routes based on user-specified route ratings and alerts. System 100 can include mobile device 102, for example. Mobile device 102 can be a computing device such as a laptop, smartphone, tablet computer or any other device that can be configured for performing navigation functions. Mobile device 102 can include navigation engine 104 for performing navigation functions on mobile device 102. For example, navigation engine 104 can be a software application that can be executed on mobile device 102. Navigation engine 104 can be configured to present a map display, present route information and receive user input related to the navigation functions of mobile device 102, as described below.

In some implementations, navigation system 100 can include a navigation service 106. For example, navigation service 106 can be a network (e.g., Internet, World Wide Web) based service for providing route information to mobile devices (e.g., mobile device 102). Navigation service 106 can include route engine 108. For example, route engine 108 can be an application or routine within navigation 106 for determining routes based on route query parameters received from mobile device 102. Navigation engine 108 can determine routes based on information stored in alert database 112 and/or rating database 110, for example.

In some implementations, rating database 110 can store information related to users' ratings of routes and/or locations. For example, a user of mobile device 102 can interact with navigation engine 104 to provide ratings for routes and/or locations. The ratings information provided by the user can be transmitted to navigation service 106 through network 114. Navigation service 106 can store the ratings information in rating database 110 and route engine can determine routes based on the ratings information stored in rating database 110.

In some implementations, alert database 112 can store information related to user-initiated alerts. For example, if a user is travelling along a road and notices an accident, the user can initiate an accident alert by providing input to a graphical interface of navigation engine 104 on mobile device 102. The alert information, including a location associated with the alert, can be transmitted to navigation service 106 through network 114 and stored in alert database 112. In some implementations, route engine 108 can determine routes based on the alert information stored in alert database 108.

In some implementations, alerts can be broadcast to mobile devices based on the locations of the mobile devices. For example, navigation service 106 can receive information identifying the current location of mobile device 102. If the current location of mobile device 102 is proximate to a location associated with the alert, the navigation service can transmit the alert to mobile device 102 and mobile device 102 can present the alert (e.g., with a sound, graphical display, or both) to the user of mobile device 102.

In some implementations, all of the alerts within an area proximate to mobile device 102 can be transmitted to the mobile device 102 and mobile device 102 can determine when to present the alerts to the user. For example, mobile device 102 can be configured to receive all alert information associated with locations within five miles of the current location of mobile device 102. Once the alert information is received, mobile device 102 can determine when to present individual alerts to the user based on the proximity of mobile device 102 to the location associated with the alert.

In some implementations, the alert information stored in alert database 112 can be removed from alert database 112 after a period of time. For example, alerts are often associated with events (e.g., an accident, a protest, etc.) that last only a short period of time. In some implementations, when an alert is generated, the alert can be associated with a period of time (e.g., 20 minutes, 1 hour, etc.). After the period of time has elapsed (e.g., the alert has expired), the alert can be removed from alert database 112. Details of the implementations described herein are described further with reference to FIGS. 2-20 below.

Figure 2:
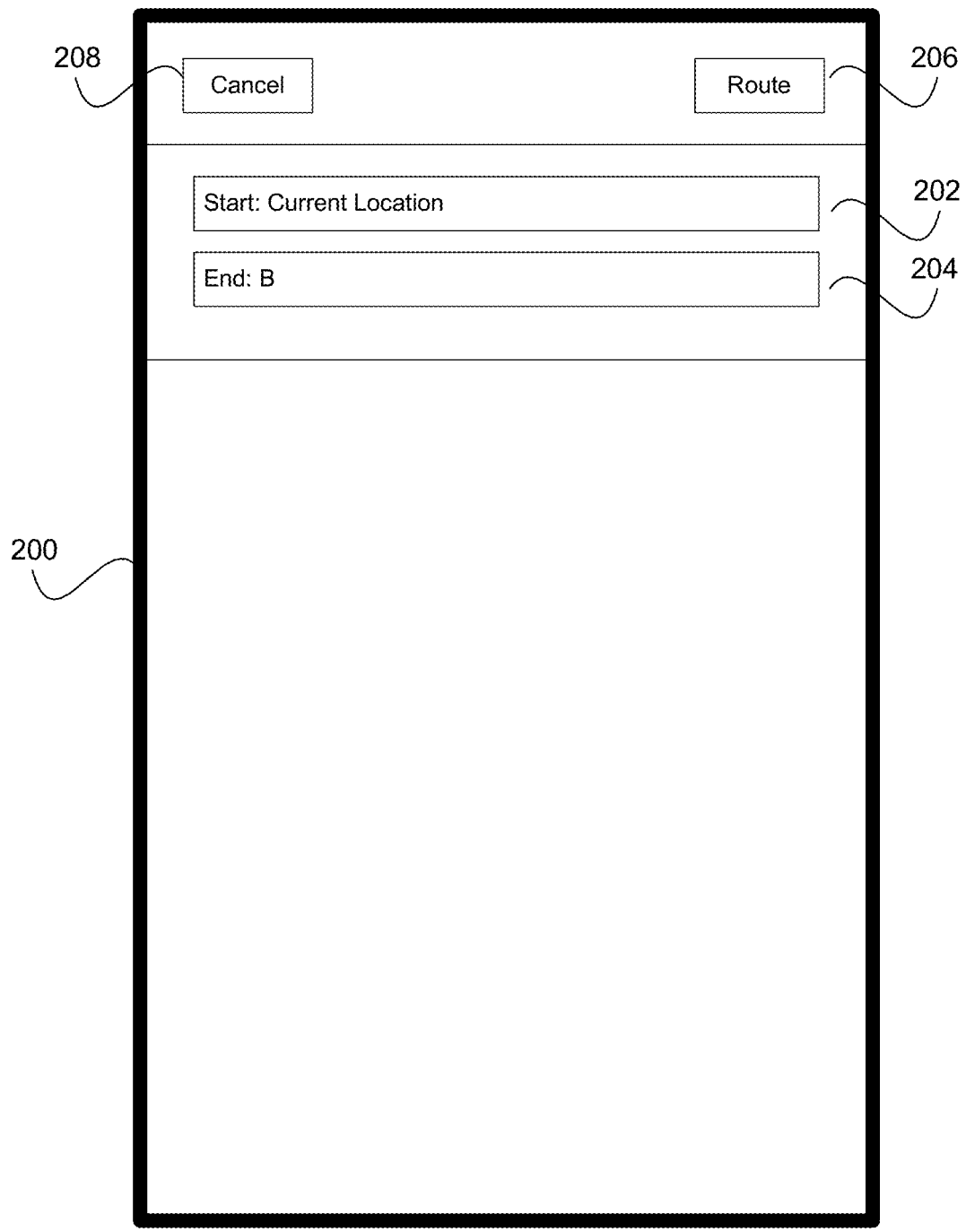
FIG. 2 is an example graphical interface for receiving user input specifying route query parameters.

FIG. 2 is an example graphical interface 200 for receiving user input specifying route query parameters. For example, graphical interface 200 can be a graphical interface of mobile device 102. Graphical interface 200 can include an input field 202 for specifying a start location. For example, a user can use a virtual keyboard to provide input to input field 202 that specifies a starting address or location for a route. Graphical interface 200 can include an input field 204 for specifying an end location. For example, a user can user a virtual keyboard to provide input to input field 204 that specifies an ending address or location for a route. In some implementations, the starting and ending addresses or locations can be selected from an address book application accessible to mobile device 102. In some implementations, a user can select graphical element 208 to close graphical interface 200 of mobile device 102.

In some implementations, once the starting and ending locations are specified, a user can select graphical element 206 to have one or more routes generated between the starting location and the ending location. For example, the starting and ending locations can be transmitted to navigation service 106 and route engine 108 can generate routes based on the starting and ending locations. Once the routes are generated, the routes can be transmitted to mobile device 102 and presented to the user.

Figure 3:
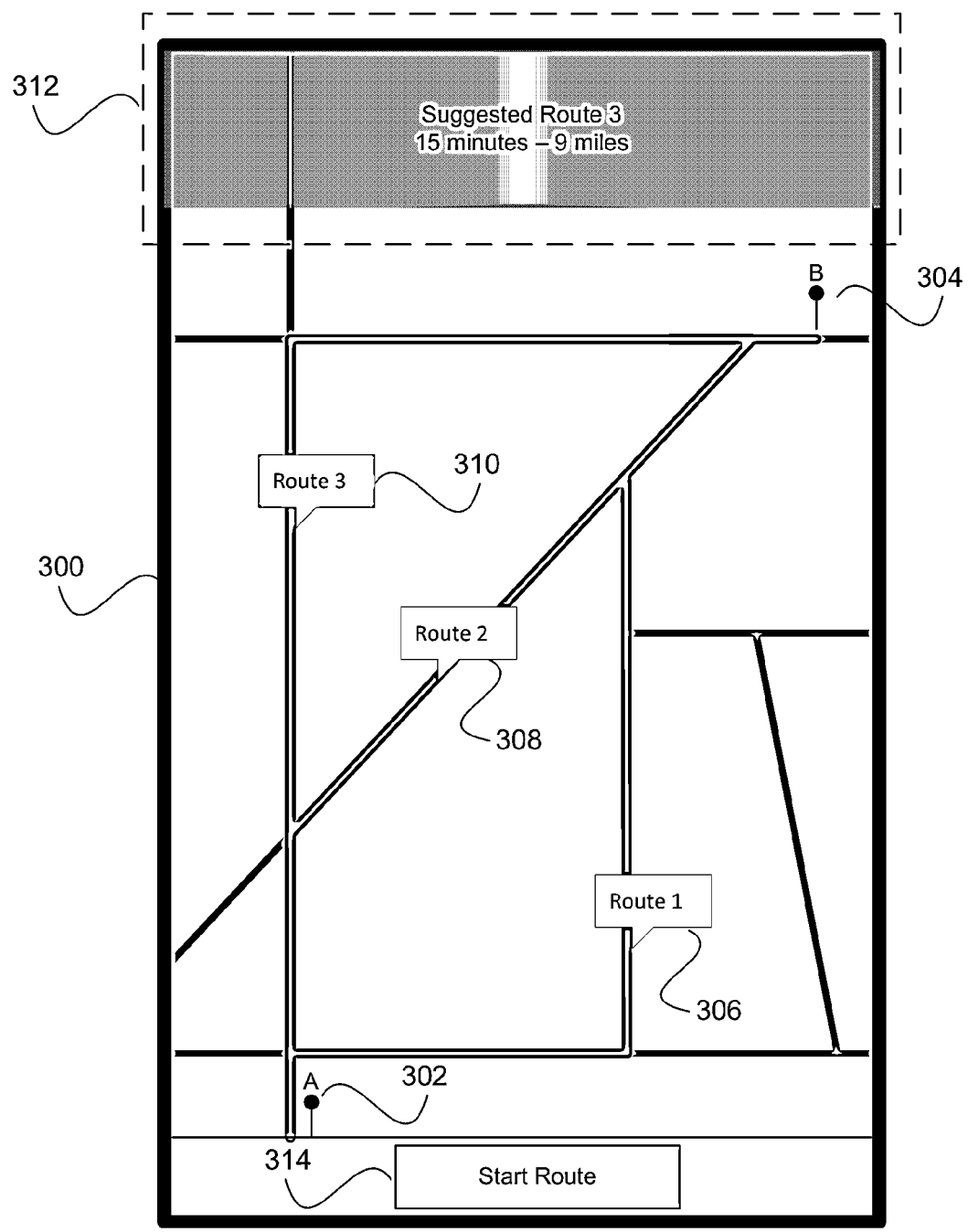
FIG. 3 illustrates an example graphical interface for presenting routes to a user.

FIG. 3 illustrates an example graphical interface 300 for presenting routes to a user. For example, graphical interface 300 can be a graphical interface of mobile device 102. In some implementations, graphical interface 300 can display a map that presents one or more routes to a user. For example, graphical interface 300 can display routes between start location 302 (point A) and end location 304 (point B). The routes between start location 302 and end location 304 can be identified by graphical elements 306, 308 and 310. In some implementations, a user can select one of graphical elements 306, 308 or 310 to display route information for the route associated with the selected graphical element. For example, route information (e.g., route identifier, route distance, estimated travel time, etc.) for the selected route can be displayed in information area 312. In some implementations, the user can start navigating the selected route by selecting graphical element 314.

Prompting for a Route Rating

Figure 4:
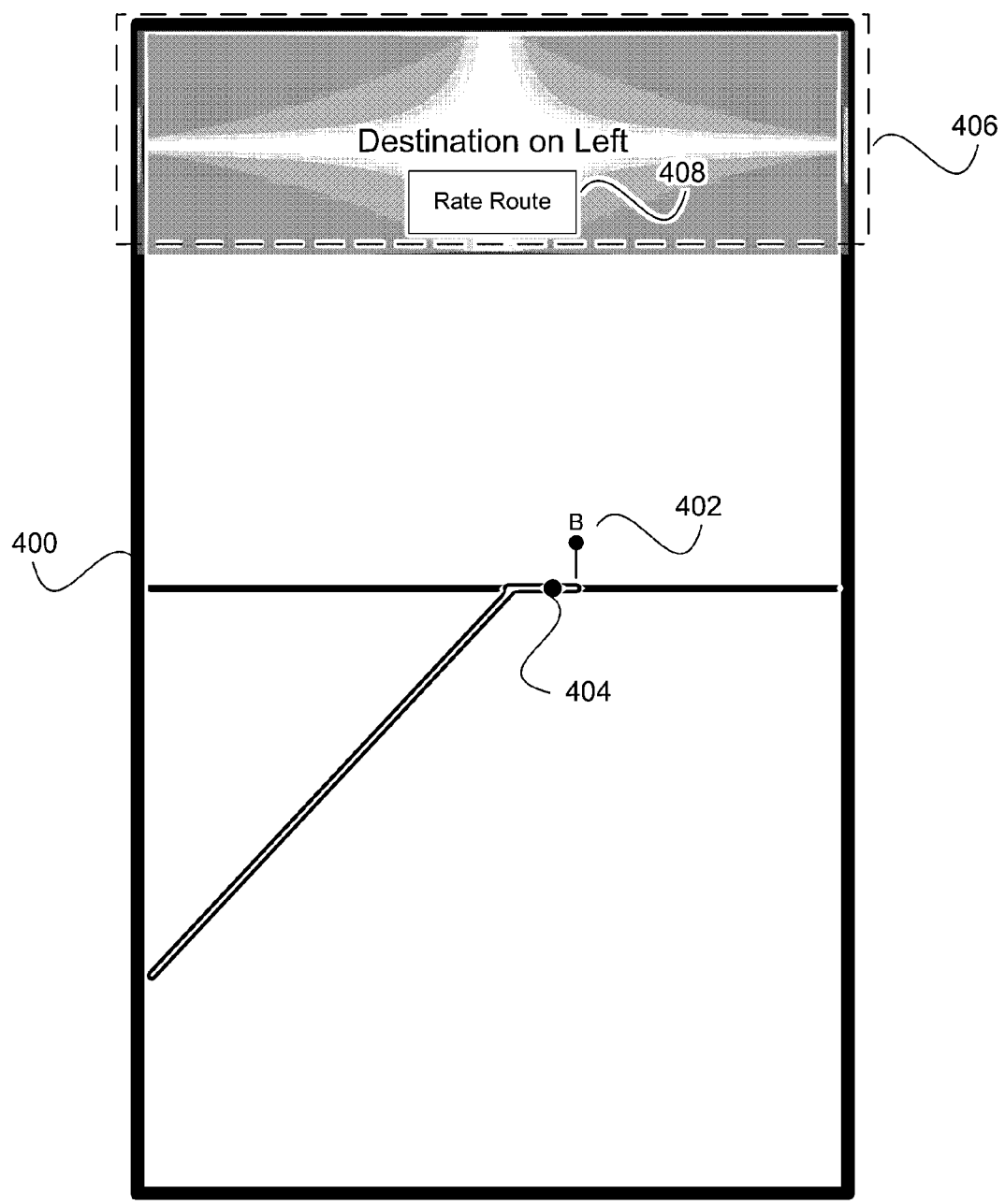
FIG. 4 illustrates an example graphical interface for prompting a user for a route rating.

FIG. 4 illustrates an example graphical interface 400 for prompting a user for a route rating. For example, graphical interface 400 can be an interface of mobile device 102. In some implementations, graphical interface 400 can present a map display that includes a portion of a route. For example, graphical interface 400 can display a route segment or the entire route. In some implementations, navigation engine 104 of mobile device 102 can detect when mobile device 102 is approaching or has reached the end location 402 (e.g., destination) associated with a selected route. For example, as mobile device 102 is navigating a route selected in graphical interface 300, mobile device 102 can monitor the current location 404 of mobile device 102. Mobile device 102 can be equipped with sensors (e.g., GPS receiver, accelerometer, magnetometer, wireless network adapters, etc.) that can be used to determine the current location of mobile device 102, for example. Navigation engine 104 can compare the current location 404 of mobile device 102 to end location 402 to determine when the mobile device has reached the end of the route.

In some implementations, a prompt for a route rating can be displayed when mobile device 102 has reached or approaches the end of a navigated route. For example, graphical interface 400 can display information area 406 including an indication that mobile device 102 has reached the end of the route. Graphical interface 400 can display graphical element 408 to give the user an opportunity to rate the route that mobile device 102 just traveled. For example, graphical element 408 can be a button for invoking graphical interface 700 of FIG. 7 for receiving route rating input from the user.

Rating a Location

Figure 5:
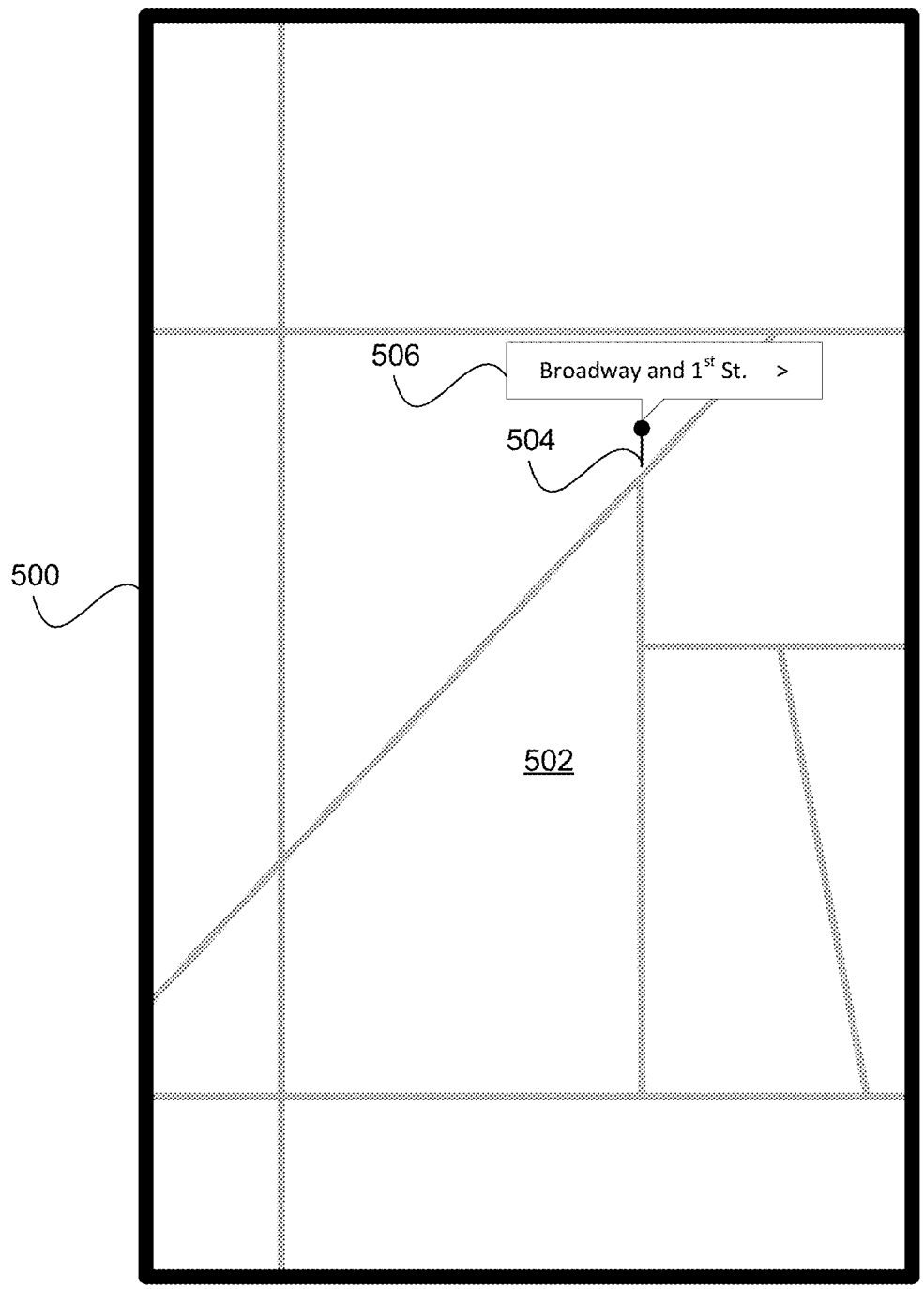
FIG. 5 illustrates an example graphical interface for identifying a location for rating.

FIG. 5 illustrates an example graphical interface 500 for identifying a location for rating. For example, graphical interface 500 can be an interface of mobile device 102. Graphical interface 500 can present map display 502. In some implementations, a user can provide input to map display 502 that identifies a location on map display 502. For example, a user can provide touch input to map display 502 to identify a location on map display 502. The location can correspond to a street or intersection, for example. The location can be marked on map display 502 by graphical element 504. For example, graphical element 504 can be a pin that indicates the user-identified location. In some implementations, graphical element 506 can be displayed in association with graphical element 504. For example, graphical element 506 can present information that describes or identifies the location associated with graphical element 504. Graphical element 506 can display a name of a street or names of intersecting streets, for example. Graphical element 506 can be displayed in response to the user selecting graphical element 504. In some implementations, a user can select graphical element 506 to invoke a graphical interface 600 of FIG. 6.

Figure 6:
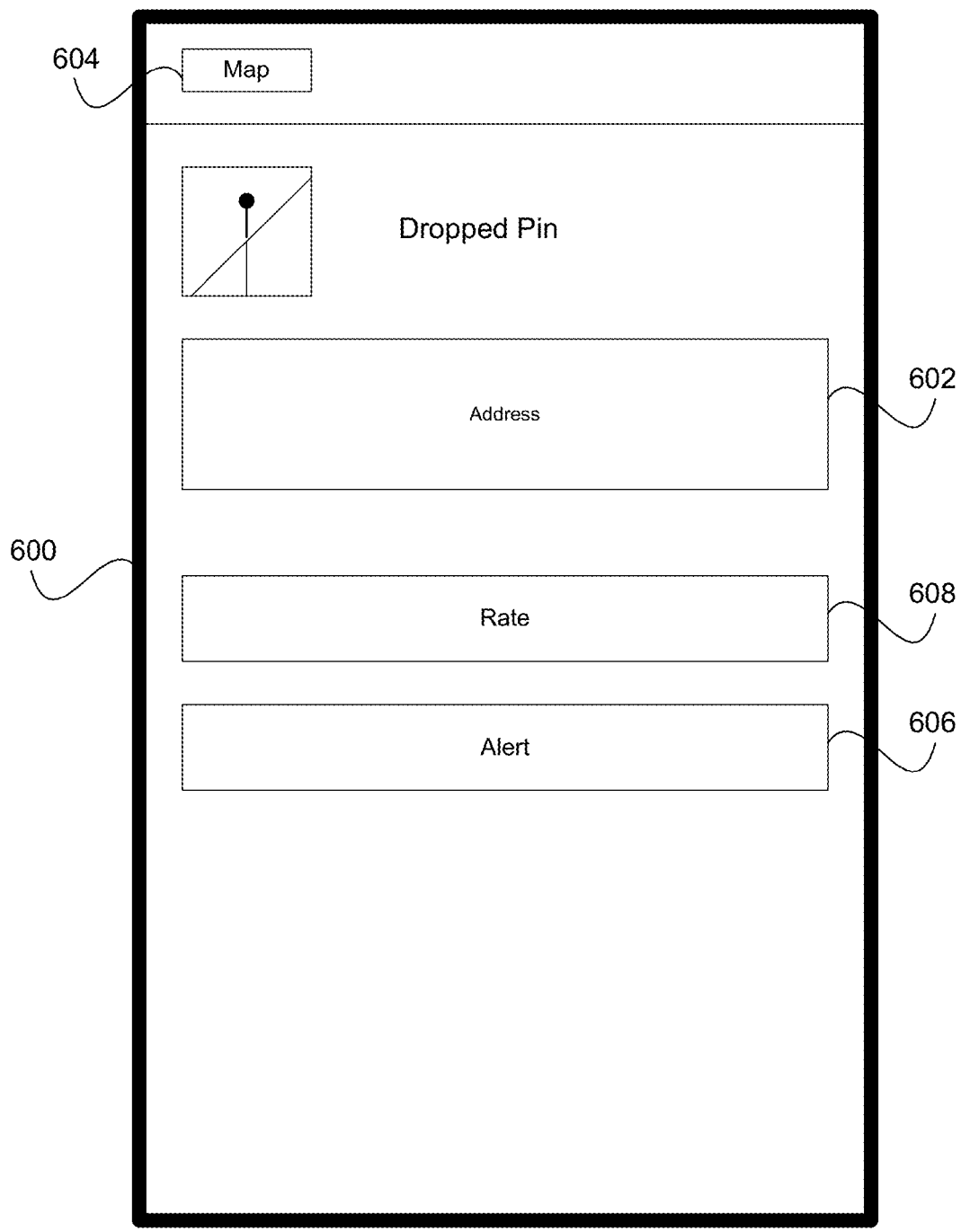
FIG. 6 illustrates an example graphical interface for presenting information and invoking functions related to an identified location.

FIG. 6 illustrates an example graphical interface 600 for presenting information and invoking functions related to an identified location. For example, graphical interface 600 can be an interface of mobile device 102. Graphical interface 600 can include graphical element 602 for presenting information (e.g., an address, geographical coordinates, street intersection, etc.) that describes the identified location. Graphical interface 600 can include graphical element 604 for returning to the map display of graphical interface 500.

In some implementations, graphical interface 600 can include graphical element 606 for invoking an interface for generating an alert associated with the selected location. For example, selection of graphical element 606 can cause graphical interface 1100 of FIG. 11 to be displayed.

In some implementations, graphical interface 600 can include graphical element 608 for invoking an interface for receiving location rating information. For example, graphical element 608 can be a button for invoking graphical interface 700 of FIG. 7 for receiving location rating input from the user.

Rating Interface

Figure 7:
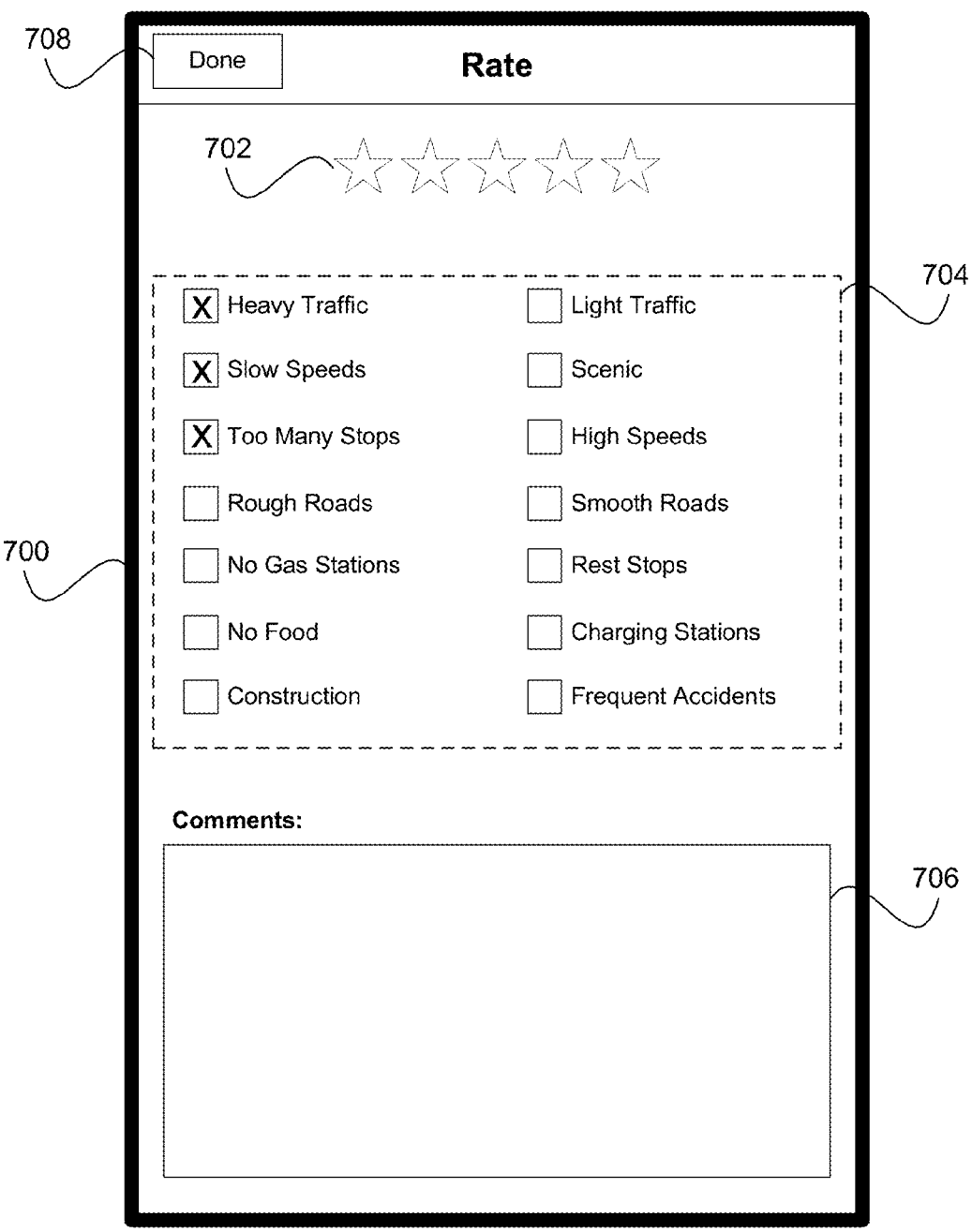
FIG. 7 illustrates an example graphical interface for receiving route or location rating information.

FIG. 7 illustrates an example graphical interface 700 for receiving route or location rating information. For example, when graphical interface 700 is invoked from graphical interface 400, graphical interface 700 can be configured to receive route rating information. When graphical interface 700 is invoked from graphical interface 600, graphical interface 700 can be configured to receive location rating information.

In some implementations, graphical interface 700 can receive a rating for a route or a location. For example, graphical interface 700 can be configured to receive a rating on a binary scale (e.g., like or dislike, good or bad, etc.). Graphical interface can be configured to receive a rating based on a non-binary scale (e.g., scale of one to five stars, scale of one to ten). In some implementations, graphical interface 700 can present graphical element 702 for receiving a rating for a route or location. For example, graphical element 702 can include objects (e.g., stars) that are selectable by the user to indicate a rating for a route or location. If five objects are presented in order from left to right, the user can select the left most object to give the route or location the lowest rating (e.g., one star). The user can select the right most object to give the route or location the highest rating (e.g., five stars). The user can select objects in the middle to give the route or location a rating between one and five. In some implementations, graphical element 702 can present a pull-down menu, check boxes, or any other type of graphical element suitable for indicating a rating value.

In some implementations, graphical interface 700 can include graphical element 704 for identifying characteristics of a route or location. For example, graphical element 704 can present pre-defined characteristics that are commonly associated with a route or location. For example, the characteristics can correspond to an amount of traffic, speed of travel, quality of road surfaces and/or facilities observed along the route or at the location. Other characteristics, such as events observed (e.g., frequent accidents, construction, etc.), can be presented as well by graphical element 704. In some implementations, a user can select one or more characteristics to associate with the route or location. For example, a user can check checkboxes associated with characteristics that the user wants to associate with the route or location, as illustrated by FIG. 7. In some implementations, a user can select characteristics from a pull-down menu or another type of graphical interface object.

In some implementations, a user can provide comments for a route or location. For example, if the user feels that the pre-defined set of characteristics do not adequately describe the route or location, the user can type text into comment field 706. In some implementations, when the user has finished providing route or location rating input to graphical interface 700, the user can select graphical element 708 to submit the user's rating information for the route or location. For example, mobile device 102 can transmit the rating information (e.g., rating value, selected characteristics, comments) for the route or location to navigation service 106 and navigation service 106 can store the rating information in rating database 110.

Route Selection Based on User Ratings

Figure 8:
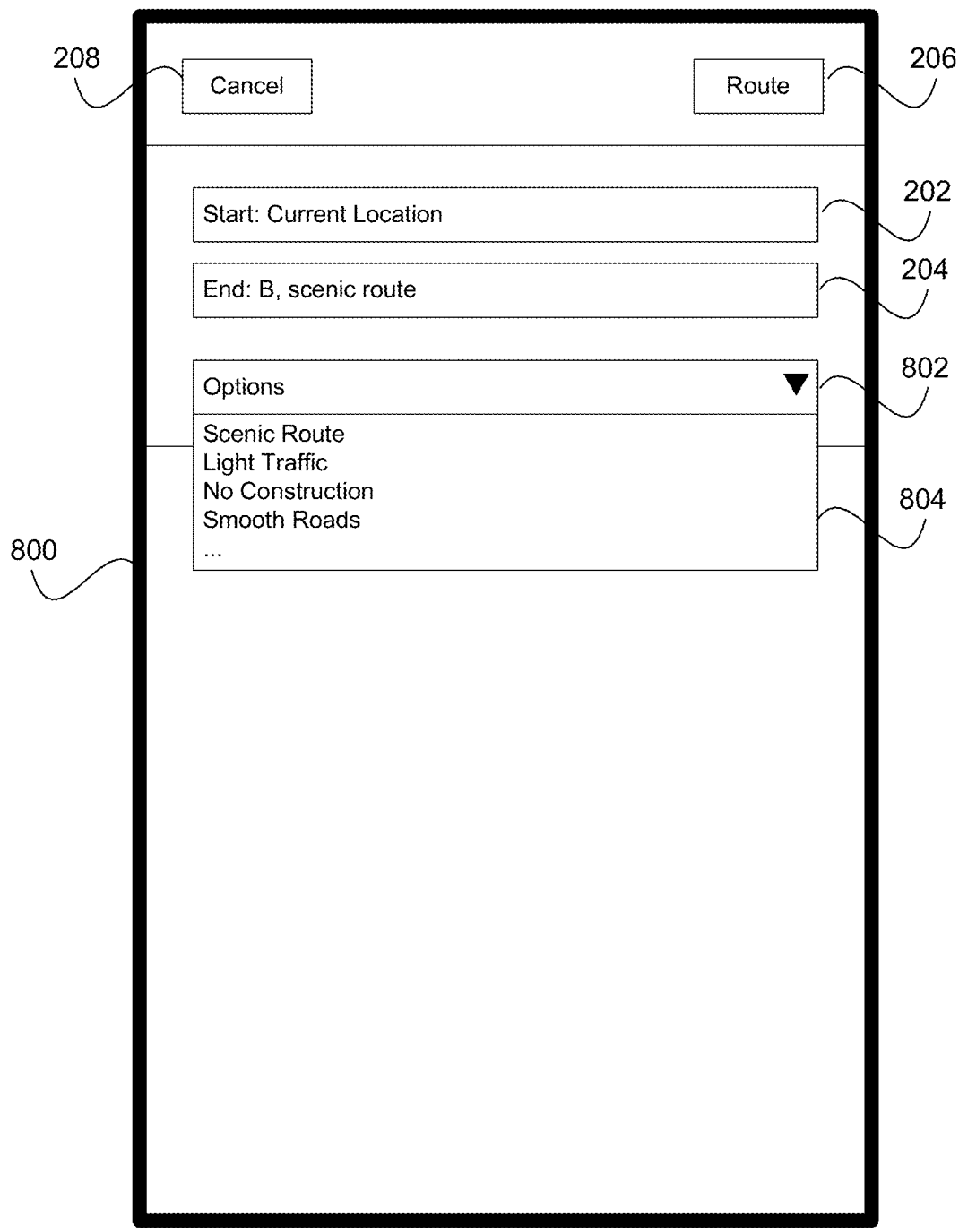
FIG. 8 is an example graphical interface for receiving user input specifying route query parameters, including desired route characteristics.

FIG. 8 is an example graphical interface 800 for receiving user input specifying route query parameters, including desired route characteristics. In some implementations, a user can specify starting and ending locations (e.g., a destination) for a route, as described above with reference to FIG. 2. In some implementations, when specifying a destination for a route, the user can specify one or more characteristics of the route. For example, if a user wants to travel from point A (starting location) to point B (ending location) along a scenic route, the user can specify "scenic route" in input field 204. A user can specify any characteristic in input field 204. For example, a user can specify one or more of the pre-defined route or location rating characteristics, described above with reference to FIG. 7. A user can specify characteristics or terms that are not pre-defined characteristics. For example, characteristics and terms entered into input field 204 can be compared to ratings comments associated with routes to determine routes that match the characteristics and terms.

In some implementations, a user can interact with graphical element 802 to select one or more pre-defined characteristics from list 804. For example, graphical element 802 can be a pull-down menu which, when selected, displays list 804. In some implementations, graphical interface 800 can present a graphical element that allows for selection of pre-defined characteristics, such as the checkboxes described with reference to graphical element 704 of FIG. 7. For example, pre-defined characteristics can be presented in association with checkboxes for selecting the pre-defined characteristics.

In some implementations, graphical interface 800 can receive input specifying a minimum rating for a route. For example, if the rating scale is a range between one and five stars, the user can specify that the route should have no less than a four star rating. In some implementations, when a user selects graphical element 206 to initiate a route determination, the route query parameters, including the route characteristics, terms and/or minimum rating, can be transmitted to route engine 108 at navigation service 106 for determining routes that match the route query parameters.

Figure 9:
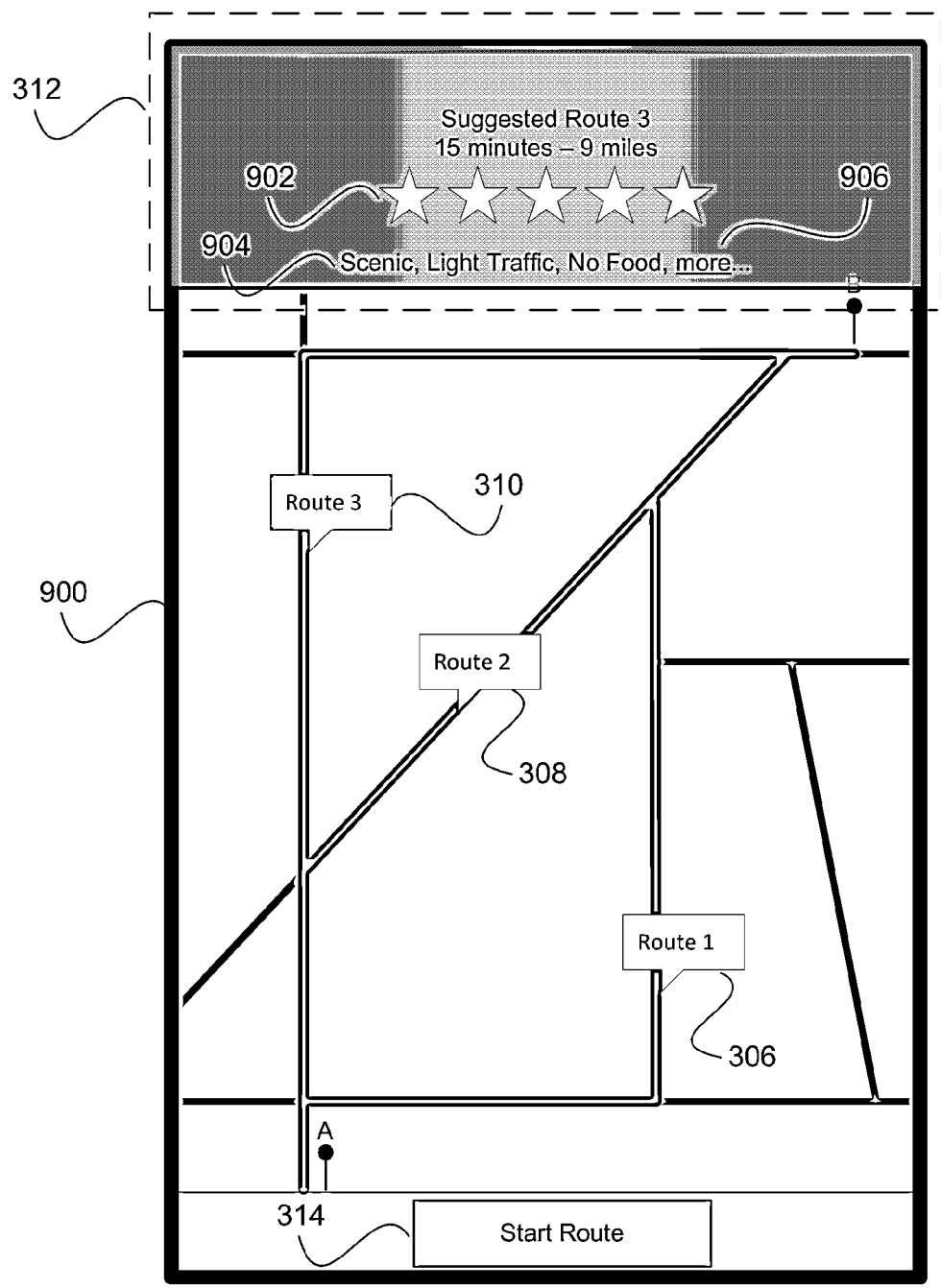
FIG. 9 is an example graphical interface for presenting routes that were selected based on user-specified ratings, route characteristics and comments.

FIG. 9 is an example graphical interface 900 for presenting routes that were selected based on user-specified ratings, route characteristics and comments. For example, route 1, route 2 and route 3 can be determined by route engine 108 based on a comparison of route query parameters and rating information stored in rating database 110. For example, rating database 110 can store the route and/or location rating information provided by users as input to graphical interface 700 of FIG. 7.

In some implementations, a user can select graphical element 310 to display information associated with a route, as described above with reference to FIG. 3. If user-specified rating information is available for the selected route, information area 312 can display rating information associated with the route. For example, information area 312 can display an average of the user ratings 902 for the route and/or the most commonly selected pre-defined route characteristics 904 (e.g., the top five most selected characteristics) associated with the route. In some implementations, a user can select graphical element 906 to display additional route rating information. For example, graphical element 906 can be a selectable text element (e.g., link, hyperlink, etc.) which, when selected, causes graphical interface 1000 of FIG. 10 to be displayed.

Figure 10:
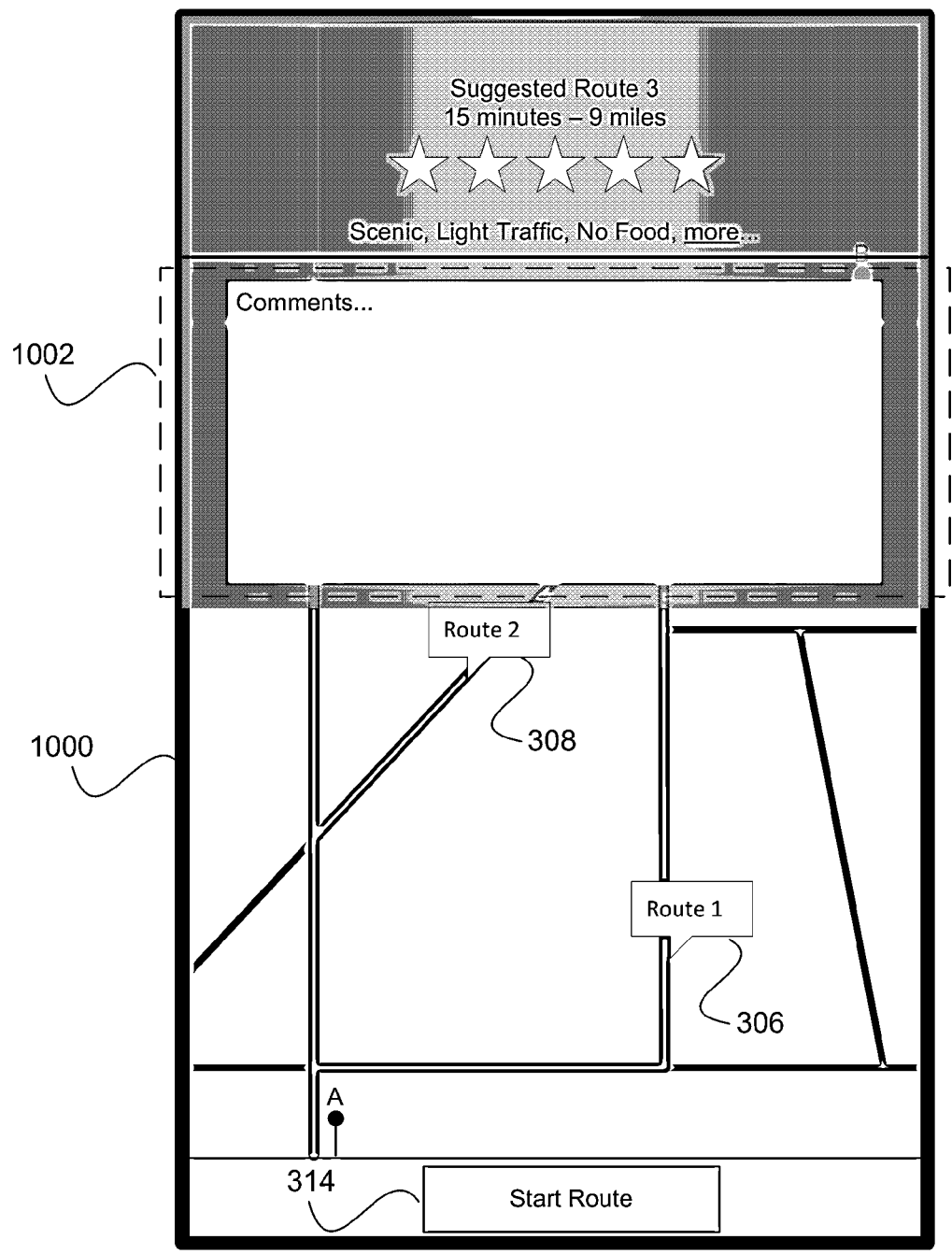
FIG. 10 is an example graphical interface for presenting more rating information associated with a route.

FIG. 10 is an example graphical interface 1000 for presenting additional rating information associated with a route. In some implementations, when graphical element 906 is selected on graphical interface 900, information area 1002 can be displayed. For example, information area 1002 can present the most frequently occurring comments received in user ratings of the selected route. Information area 1002 can also present additional pre-defined route characteristics that were selected by users for the selected route.

User Initiated Alerts

Figure 11:
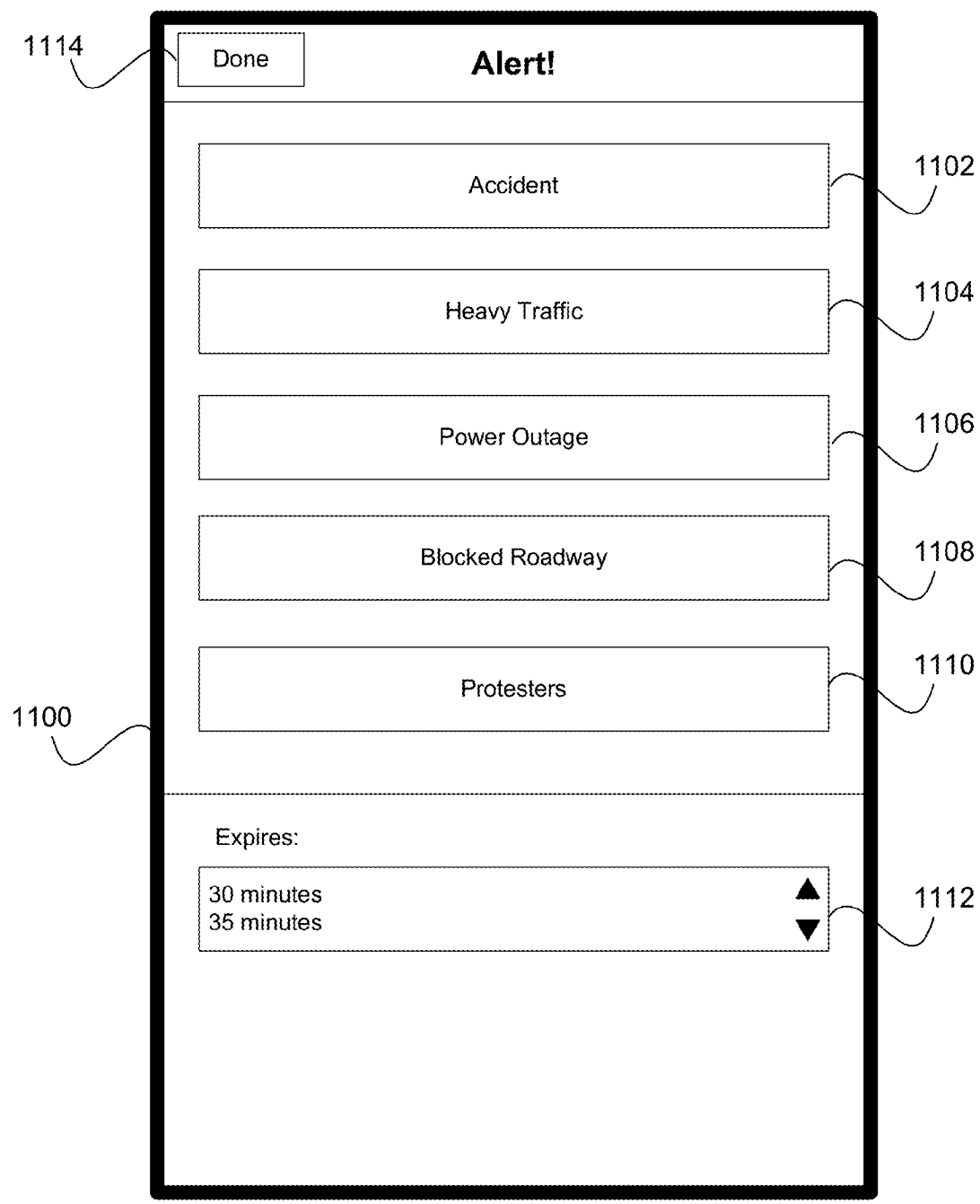
FIG. 11 is an example graphical interface for generating an alert.

FIG. 11 is an example graphical interface 1100 for generating an alert. For example, graphical interface 1100 can be presented in response to a user selecting graphical element 606 of FIG. 6. In some implementations, graphical interface 1100 can be presented in response to a user selecting graphical element 504 of FIG. 5. For example, if mobile device 102 is configured to receive touch input, a user can provide sustained touch input (e.g., touch for 2 seconds) associated with graphical element 504 to cause graphical interface 1100 to appear. The geographic location associated with graphical element 504 can be used as the location of the alert.

In some implementations, graphical interface 1100 can be presented in response to touch input anywhere on map display 502 of FIG. 5. For example, a user and mobile device 102 traveling along a road may be forced to stop because a traffic accident is blocking the user's progress. The current location of the user and the current location mobile device 102 will likely be proximate to the location of the traffic accident. Because the location of mobile device 102 is proximate to the traffic accident, the current location of mobile device 102 can be used to specify the location of accident and the location of the alert. For example, a sustained touch input (e.g., touch for 2 seconds) to map display 502 can cause graphical interface 1100 to be displayed.

In some implementations, graphical interface 1100 can include graphical elements 1102-1110 for specifying a type of alert. For example, a user can select graphical element 1102 (e.g., a button) to specify an accident alert. In some implementations, graphical interface 1100 can include graphical element 1112 for specifying a duration of time during which the alert will be active. For example, the user can specify that the alert should be active for the next forty-five minutes. When forty-five minutes has passed, navigation service 106 can remove the alert from alert database 112. Once the user has defined the type of alert and duration of the alert, the user can select graphical element 1114 to submit the alert to navigation service 106 of FIG. 1 and close graphical interface 1100. For example, mobile device 102 can transmit the alert information to navigation service 106. In some implementations, navigation service 106 can add the alert information (e.g., location, alert type, and duration) to alert database 112.

Figure 12:
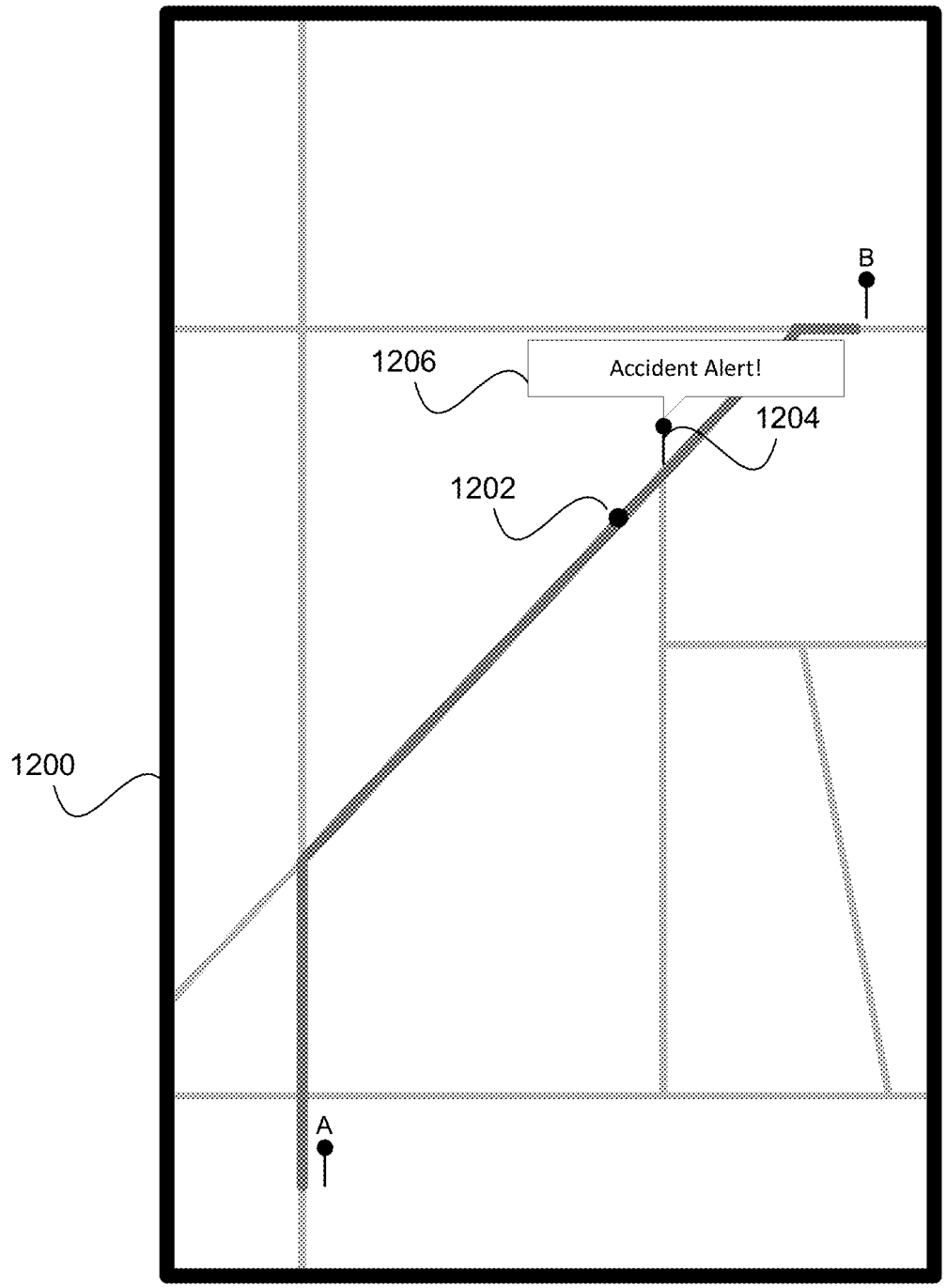
FIG. 12 is an example graphical interface for presenting an alert.

FIG. 12 is an example graphical interface 1200 for presenting an alert. For example, graphical interface 1200 can be an interface for presenting alerts on mobile device 102. In some implementations, mobile device 102 can transmit the current location of mobile device 102 to navigation service 106. Navigation service 106 can compare the current location of mobile device 102 to locations associated with alert information in alert database 112 to determine if any of there are any alerts proximate to mobile device 102. For example, navigation service 106 can determine if there are any alerts associated with locations within one mile of the current location of mobile device 102. If navigation service 106 determines that there are alerts proximate to the location of mobile device 102, navigation service 106 can transmit the alert information to mobile device 102.

In some implementations, alert information can be presented on graphical interface 1200. For example, graphical element 1202 can represent the current location of mobile device 102. Graphical element 1204 (e.g., a pin) can be displayed to identify the location associated with an alert received from navigation service 106. Graphical element 1206 can display information identifying the type of alert. In some implementations, an alert received at mobile device 102 can cause mobile device 102 to generate a sound. For example, when mobile device 102 receives an alert, mobile device 102 can generate an alarm sound to notify the user of the received alert.

In some implementations, routes can be determined based on alert information. For example, a user can specify route query parameters on graphical interface 800 of FIG. 8. Graphical interface 800 can receive input from the user specifying that locations associated with alerts should be avoided when determining routes. When a user has specified that alert locations should be avoided, route engine 108 can determine routes between the start location and the end location and filter out routes that include locations associated with the alerts stored in alert database 112.

Example Processes

Figure 13:
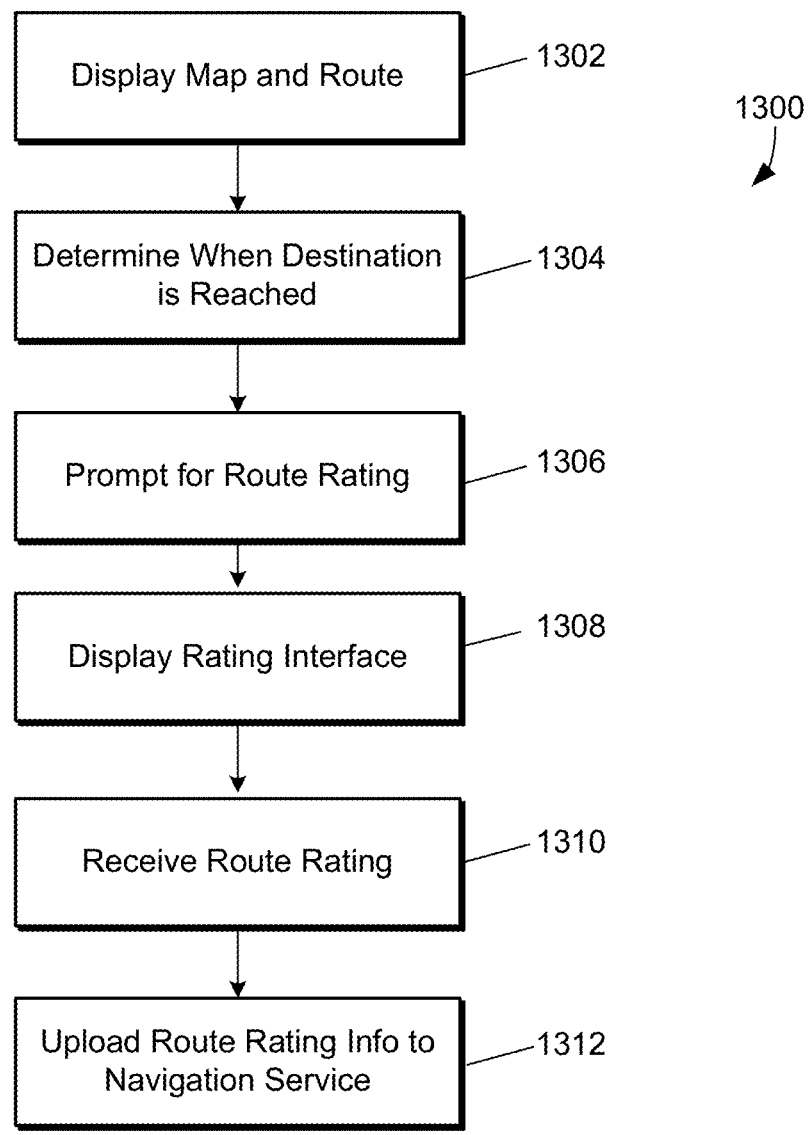
FIG. 13 is flow diagram of an example route rating process.

FIG. 13 is flow diagram of an example route rating process 1300. At step 1302, a map and route are displayed. For example, a user of a mobile device can request a route from a starting location to an ending location (destination). The request can be transmitted to a navigation service. The navigation service can transmit route information back to the mobile device. The mobile device can display a map and the route information received from the navigation service.

At step 1304, the mobile device can determine when the mobile device reaches the destination. For example, the mobile device can be configured with GPS or another location technology from which the current location of the mobile device can be obtained. The mobile device can compare the mobile device's current location to the destination location of the route to determine when the mobile device has reached the destination.

At step 1306, the user of the mobile device is prompted for a route rating when the mobile device has reached the destination. For example, a graphical interface of the mobile device can present information indicating that the destination has been reached and allow the user to select to provide a route rating, as described with reference to FIG. 4.

At step 1308, a rating interface can be displayed. For example, graphical interface 700 of FIG. 7 can be displayed. At step 1310, route rating information can be received. For example, the user can provide a route rating, including route characteristics and comments, as described with reference to FIG. 7.

At step 1312, the route rating information can be uploaded to the navigation service. For example, mobile device 102 can transmit the route rating information to navigation service 106. Navigation service 106 can store the route rating information in rating database 110 and reference the route rating information when determining routes in the future.

Figure 14:
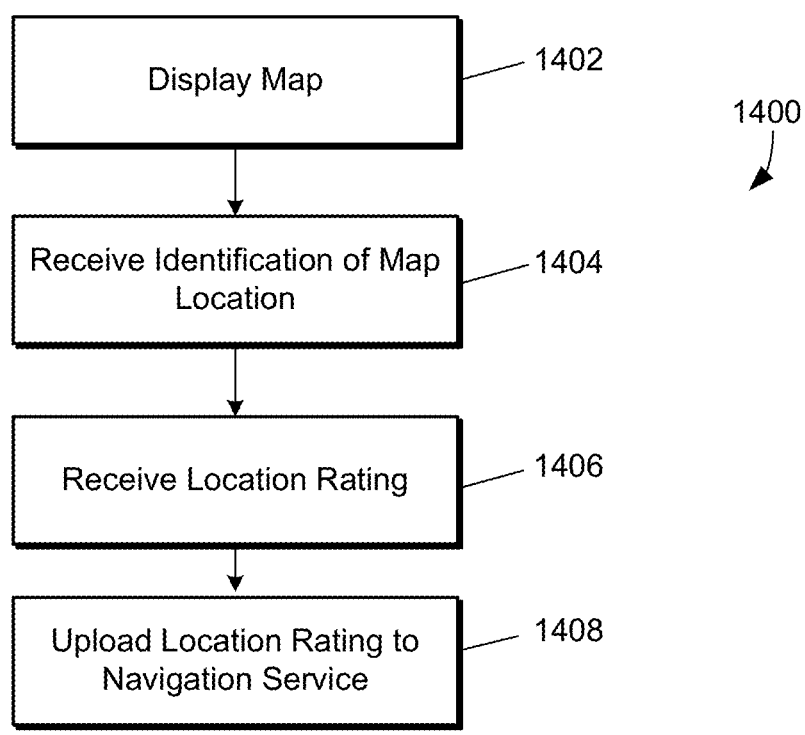
FIG. 14 is flow diagram of an example location rating process.

FIG. 14 is flow diagram of an example location rating process 1400. At step 1402, a map is displayed. For example, a map display can be presented on graphical interface 500 of mobile device 102. At step 1404, an identification of a location on the map is received. For example, a user can provide input corresponding to a location on the map displayed on graphical interface 500.

At step 1406, a location rating can be received. For example, the user can input information rating the identified location, as described with reference to FIGS. 5-7. At step 1408, the location rating can be uploaded to the navigation service. For example, mobile device 102 can transmit the location rating information to navigation service 106. Navigation service 106 can store the location rating information in rating database 110 and reference the location rating information when determining routes in the future.

Figure 15:
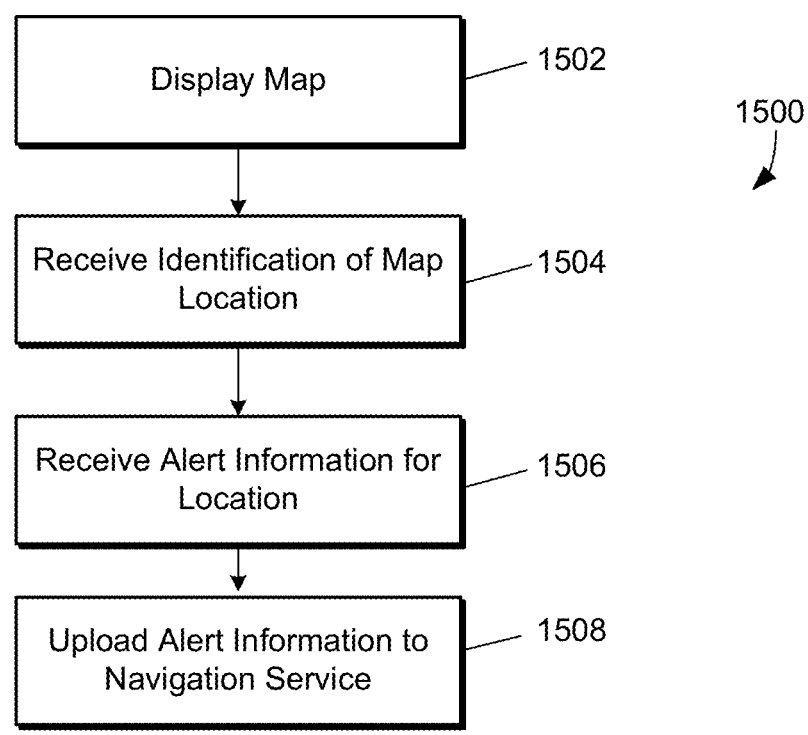
FIG. 15 is a flow diagram of an example alert generation process.

FIG. 15 is a flow diagram of an example alert generation process 1500. At step 1502, a map is displayed. For example, a map display can be presented on mobile device 102. At step 1504, identification of a map location is received. For example, a user can provide input to identify a location on the map display or the location can be derived from the current location of the mobile device.

At step 1506, alert information for the identified location is received. For example, a user can input information describing or defining an alert as described with reference to FIG. 11. At step 1508, the alert information, including alert location, can be uploaded to a navigation service. For example, mobile device 102 can transmit the alert information to navigation service 106. Navigation service 106 can store the alert information in alert database 112 and reference the alert information when determining routes in the future or when a current location of the mobile device is received at navigation service 106.

Figure 16:
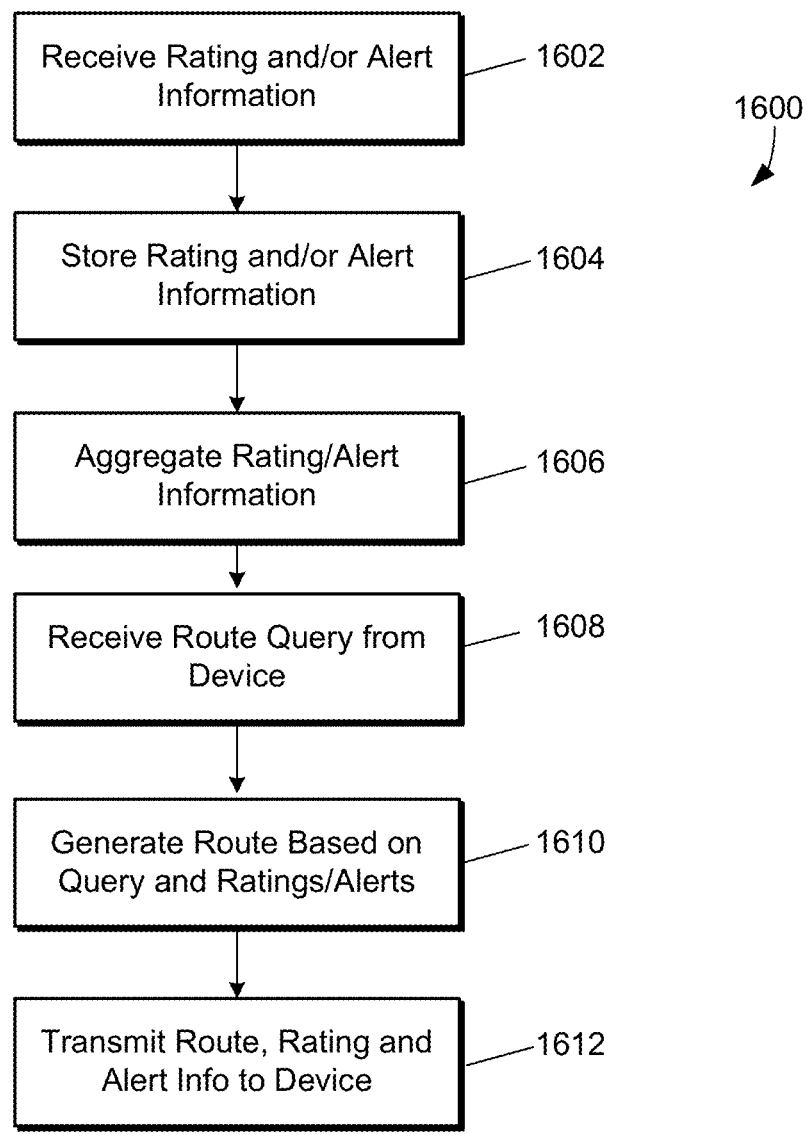
FIG. 16 is a flow diagram of an example process for determining routes based on user-specified rating and/or alert information.

FIG. 16 is a flow diagram of an example process 1600 for determining routes based on user-specified rating and/or alert information. At step 1602, rating and/or alert information is received from a mobile device. For example, mobile device 102 can transmit route and/or location rating information to navigation service 106. Route and location rating information can include the rating information described with reference to FIG. 7, for example. Mobile device 102 can transmit alert information to navigation service 106. Alert information can include the alert information described with reference to FIG. 11, for example.

At step 1604, rating and/or alert information is stored. For example, navigation service 106 can store route and location rating information in rating database 110. Navigation service 106 can store alert information in alert database 112.

At step 1606, rating and/or alert information is aggregated. For example, rating information received for a route from multiple devices and/or user can be combined into an aggregate rating. Rating values can be averaged. Route characteristics can be counted and associated with a frequency value (e.g., frequency of occurrence). Comments can be analyzed, summarized, categorized and/or counted to determine the most frequently received comments.

In some implementations, alert information can be aggregated. For example, if navigation service 106 received multiple accident alerts for a single location (or proximate to a single location), those alerts can be combined into a single accident alert. If the alerts are associated with different locations that are geographically proximate, the locations of the alert can be averaged and the averaged location can be assigned as the location associated with the aggregated alerts.

At step 1608, a route query is received from a mobile device. For example, a route query can be received from mobile device 102 at navigation service 106. The route query can include route parameters, as described with reference to FIG. 8 above.

At step 1610, routes are generated based on the route query and rating and alert information. For example, route engine 108 can determine routes between a starting location (point A) and an ending location (point B), as specified by the user in the route parameters of the route query. For example, route engine 108 can determine the five routes between point A and point B that have the shortest distance or the shortest travel time.

In some implementations, route engine 108 can filter or prioritize the determined routes based on rating information. For example, if route and/or location rating information exist in rating database 110 for the determined routes (or portions of the determined routes, or locations along the determined routes), route engine 108 can filter or prioritize the determined routes based on the rating information. If, for example, the user's query indicates that the user wants a "scenic" route and the route ratings associated with one of the determined routes indicates that the route is a scenic route, then the route associated with the "scenic" characteristic will be prioritized or presented before the other determined routes. If the user's query indicates that the user wants to avoid construction, routes that are associated with a construction characteristic can be filtered out or removed from the set of determined routes. If the user's query indicates that a four-star rating is required, then routes with less than a four star rating can be removed from the set of determined routes.

In some implementations, route engine 108 can filter or prioritize the determined routes based on alert information. For example, route engine 108 can determine if any of the alerts stored in alert database 112 are associated with locations along any of the determined routes. If a route includes a location associated with an alert (e.g., accident alert), the route can be reduced in priority (e.g., presented last, or moved to the end of the list of routes) or filtered from the set of determined routes.

At step 1612, routes, ratings and/or alert information is transmitted to the mobile device. For example, once route engine 108 determines the routes between point A and point B that satisfy the route query, navigation service 106 can transmit the determined, prioritized and/or filtered routes to mobile device 102 for presentation to the user. Navigation service 106 can also transmit ratings and alert information associated with each route to mobile device 102 for presentation to the user.

Figure 17:
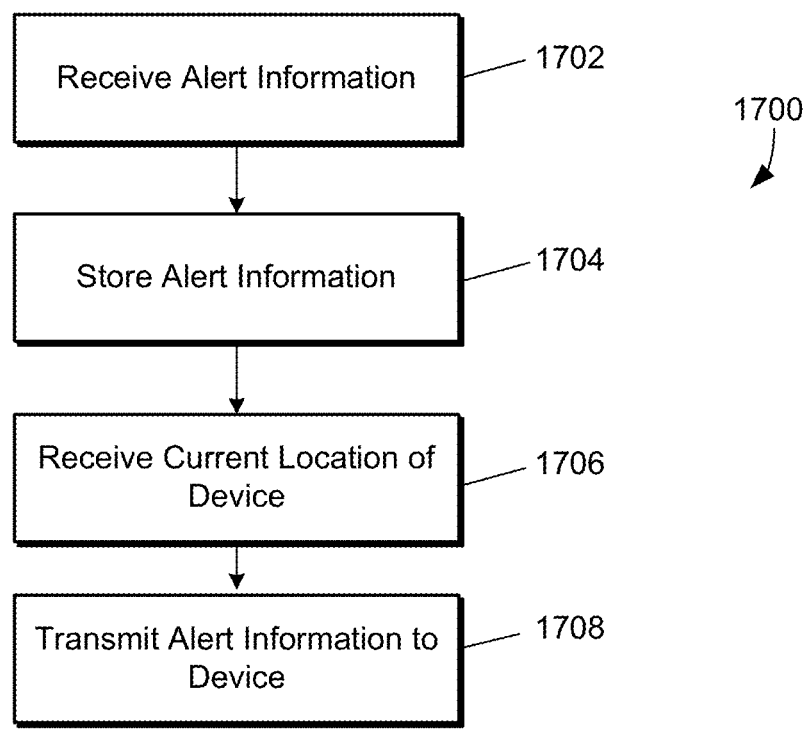
FIG. 17 is a flow diagram of an example process for broadcasting user-generated alerts.

FIG. 17 is a flow diagram of an example process 1700 for broadcasting user-generated alerts. At step 1702, alert information is received. For example, alert information (e.g., alert type, duration or time period of the alert, and location associated with the alert) can be received at navigation service 106. The transmitted alert information can include a proximity value for receiving alerts. For example, the proximity value can be a user-specified distance value that can be used to determine which alert information to transmit to mobile device 102.

At step 1704, the alert information can be stored. For example, navigation service 106 can store the received alert information in alert database 112. Navigation service 106 and/or route engine 108 can manage alert database 112. For example, alert database 112 can be managed such that expired alerts are removed from alert database 112. An expired alert can be an alert that has been in database 112 for a period of time exceeding the duration or period of time assigned to the alert by the user, for example.

At step 1706, the current location of a mobile device can be received. For example, mobile device 102 can transmit the current location of mobile device 102 to navigation service 106. Navigation service 106 can compare the current location of mobile device 102 to locations associated with alerts in alert database 112 to identify which alert information is within the specified proximity (e.g., within the user-specified distance) of mobile device 102.

At step 1708, alert information can be transmitted to the mobile device. For example, navigation service 106 can transmit the alert information identified at step 1706 to mobile device 102.

In some implementations, alert information can be identified based on a route associated with the mobile device. For example, if mobile device 102 has previously requested a route from navigation service 106, navigation service 106 can identify alerts that are associated with locations along the route and transmit those alerts to mobile device 102. Mobile device 102 can then display the alerts along the route and give the user an opportunity to change route and/or avoid those alert locations.

For example, when a user selects or starts a route on mobile device 102, mobile device 102 can transmit information identifying the route (active route) and an identifier of the mobile device to navigation service 106. Navigation service 106 can store the mobile device identifier in association with the active route information in an active route database. When navigation service 106 receives new alert information, the location associated with the new alert information can be compared to locations along active routes and, if the new alert information is located along an active route, navigation service 106 can transmit the new alert information to mobile devices traveling along the active route. A mobile device can be disassociated from an active route once the mobile device reaches the route destination. For example, mobile device 102 can transmit a message to navigation service 106 indicating that mobile device 102 has reached the route destination. Navigation service 106 can remove the active route information and/or mobile device identifier from the active route database.

Figure 18:
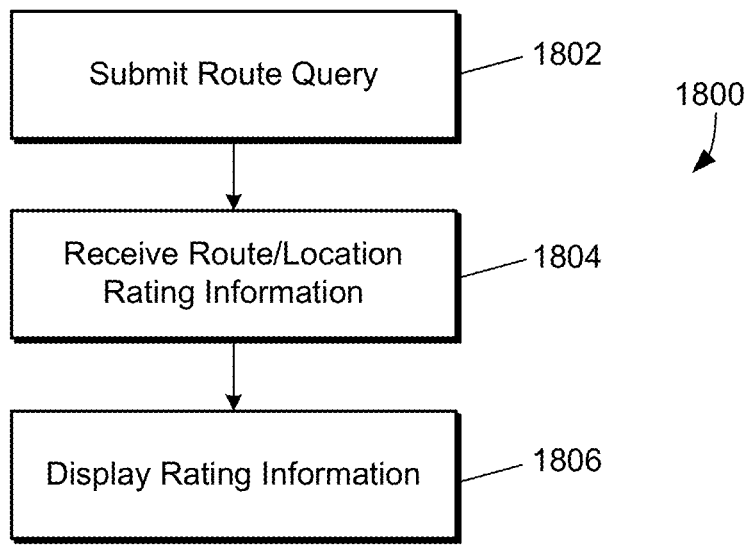
FIG. 18 is a flow diagram of an example process for displaying route rating information on a mobile device.

FIG. 18 is a flow diagram of an example process 1800 for displaying route rating information on a mobile device. At step 1802, a route query can be submitted. For example, a user can provide input to graphical interface 800 (FIG. 8) of mobile device 102. Mobile device 102 can transmit the route query, including route parameters, to navigation service 106.

At step 1804, route and/or location rating information can be received. For example, when navigation service 106 responds to the route query by generating a route and transmitting the route to mobile device 102, navigation service 106 can also transmit route rating information for the route and/or location rating information for locations along the route. In some implementations, when route or location ratings have been received from many users, the ratings information can be aggregated and only the most frequently seen (e.g., top 5 most frequently received characteristics, average ratings values, etc.) ratings information will be received at mobile device 102.

At step 1806, the rating information can be displayed. For example, the received ratings information can be displayed on graphical interface 900 of FIG. 9 or graphical interface 1000 of FIG. 10.

Figure 19:
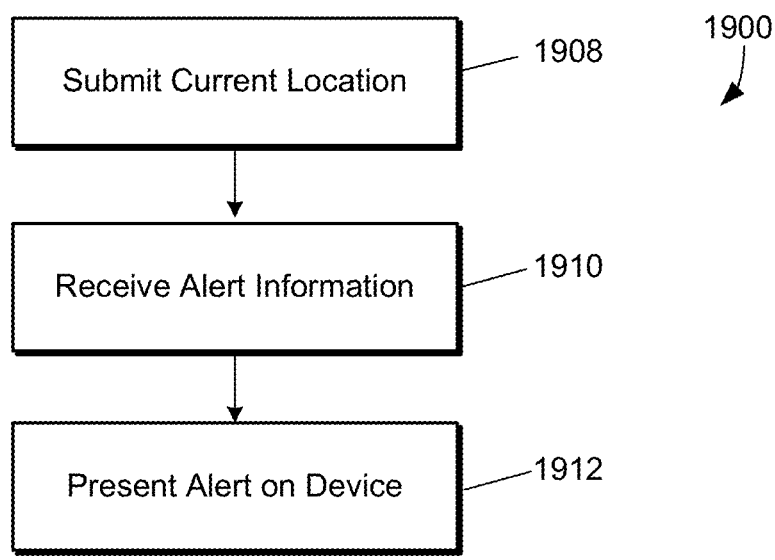
FIG. 19 is a flow diagram of an example process for displaying alert information on a mobile device.

FIG. 19 is a flow diagram of an example process 1900 for displaying alert information on a mobile device. At step 1908, the current location of a mobile device can be submitted. For example, mobile device 102 can transmit the current location of mobile device 102 to navigation service 106.

At step 1910, alert information can be received. For example, mobile device 102 can receive alert information from navigation service 106. At step 1912, alert information can be presented on the mobile device. For example, alert information can be presented on graphical interface 1200 of FIG. 12

Example System Architecture

Figure 20:
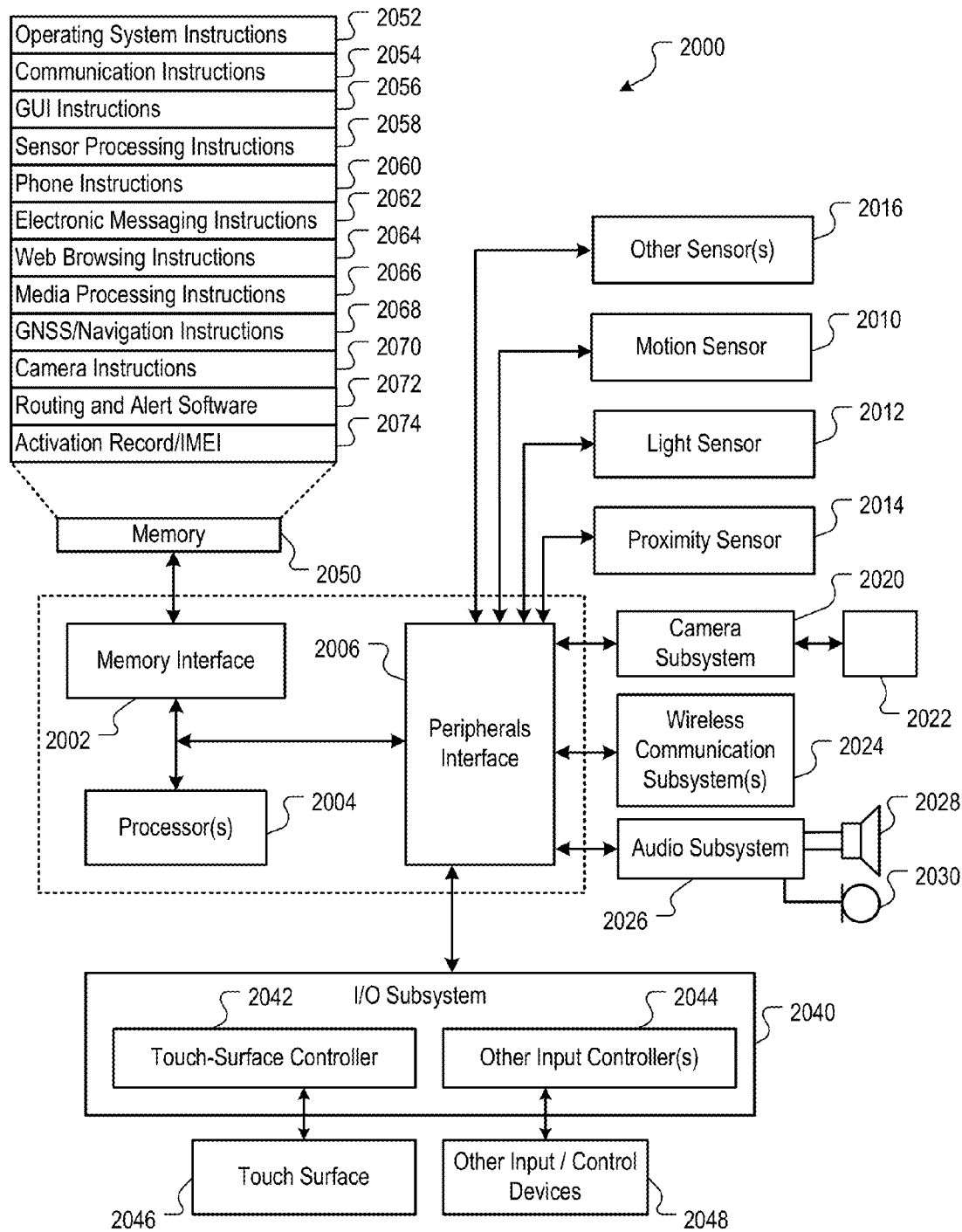
FIG. 20 is a block diagram of an example computing device that can implement the features and processes of FIGS. 1-19.

FIG. 20 is a block diagram of an example computing device 2000 that can implement the features and processes of FIGS. 1-19. For example, computing device 2000 can correspond to mobile device 102 of FIG. 1. The computing device 2000 can include a memory interface 2002, one or more data processors, image processors and/or central processing units 2004, and a peripherals interface 2006. The memory interface 2002, the one or more processors 2004 and/or the peripherals interface 2006 can be separate components or can be integrated in one or more integrated circuits. The various components in the computing device 2000 can be coupled by one or more communication buses or signal lines.

Sensors, devices, and subsystems can be coupled to the peripherals interface 2006 to facilitate multiple functionalities. For example, a motion sensor 2010, a light sensor 2012, and a proximity sensor 2014 can be coupled to the peripherals interface 2006 to facilitate orientation, lighting, and proximity functions. Other sensors 2016 can also be connected to the peripherals interface 2006, such as a global navigation satellite system (GNSS) (e.g., GPS receiver), a temperature sensor, a biometric sensor, or other sensing device, to facilitate related functionalities.

A camera subsystem 2020 and an optical sensor 2022, e.g., a charged coupled device (CCD) or a complementary metal-oxide semiconductor (CMOS) optical sensor, can be utilized to facilitate camera functions, such as recording photographs and video clips. The camera subsystem 2020 and the optical sensor 2022 can be used to collect images of a user to be used during authentication of a user, e.g., by performing facial recognition analysis.

Communication functions can be facilitated through one or more wireless communication subsystems 2024, which can include radio frequency receivers and transmitters and/or optical (e.g., infrared) receivers and transmitters. The specific design and implementation of the communication subsystem 2024 can depend on the communication network(s) over which the computing device 2000 is intended to operate. For example, the computing device 2000 can include communication subsystems 2024 designed to operate over a GSM network, a GPRS network, an EDGE network, a Wi-Fi or WiMax network, and a Bluetooth™ network. In particular, the wireless communication subsystems 2024 can include hosting protocols such that the device 100 can be configured as a base station for other wireless devices.

An audio subsystem 2026 can be coupled to a speaker 2028 and a microphone 2030 to facilitate voice-enabled functions, such as speaker recognition, voice replication, digital recording, and telephony functions. The audio subsystem 2026 can be configured to facilitate presenting location alert sounds, as described above with reference to FIGS. 1-19.

The I/O subsystem 2040 can include a touch-surface controller 2042 and/or other input controller(s) 2044. The touch-surface controller 2042 can be coupled to a touch surface 2046. The touch surface 2046 and touch-surface controller 2042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2046.

The other input controller(s) 2044 can be coupled to other input/control devices 2048, such as one or more buttons, rocker switches, thumb-wheel, infrared port, USB port, and/or a pointer device such as a stylus. The one or more buttons (not shown) can include an up/down button for volume control of the speaker 2028 and/or the microphone 2030.

In one implementation, a pressing of the button for a first duration can disengage a lock of the touch surface 2046; and a pressing of the button for a second duration that is longer than the first duration can turn power to the computing device 2000 on or off. Pressing the button for a third duration can activate a voice control, or voice command, module that enables the user to speak commands into the microphone 2030 to cause the device to execute the spoken command. The user can customize a functionality of one or more of the buttons. The touch surface 2046 can, for example, also be used to implement virtual or soft buttons and/or a keyboard.

In some implementations, the computing device 2000 can present recorded audio and/or video files, such as MP3, AAC, and MPEG files. In some implementations, the computing device 2000 can include the functionality of an MP3 player, such as an iPod™. The computing device 2000 can, therefore, include a 36-pin connector that is compatible with the iPod. Other input/output and control devices can also be used.

The memory interface 2002 can be coupled to memory 2050. The memory 2050 can include high-speed random access memory and/or non-volatile memory, such as one or more magnetic disk storage devices, one or more optical storage devices, and/or flash memory (e.g., NAND, NOR). The memory 2050 can store an operating system 2052, such as Darwin, RTXC, LINUX, UNIX, OS X, WINDOWS, or an embedded operating system such as VxWorks.

The operating system 2052 can include instructions for handling basic system services and for performing hardware dependent tasks. In some implementations, the operating system 2052 can be a kernel (e.g., UNIX kernel). In some implementations, the operating system 2052 can include instructions for performing voice authentication. For example, operating system 2052 can implement the route rating and alert features as described with reference to FIGS. 1-19.

The memory 2050 can also store communication instructions 2054 to facilitate communicating with one or more additional devices, one or more computers and/or one or more servers. The memory 2050 can include graphical user interface instructions 2056 to facilitate graphic user interface processing; sensor processing instructions 2058 to facilitate sensor-related processing and functions; phone instructions 2060 to facilitate phone-related processes and functions; electronic messaging instructions 2062 to facilitate electronic-messaging related processes and functions; web browsing instructions 2064 to facilitate web browsing-related processes and functions; media processing instructions 2066 to facilitate media processing-related processes and functions; GNSS/Navigation instructions 2068 to facilitate GNSS and navigation-related processes and instructions; and/or camera instructions 2070 to facilitate camera-related processes and functions.

The memory 2050 can store route rating and alert software instructions 2072 to facilitate other processes and functions, such as the route rating and alert processes and functions as described with reference to FIGS. 1-19. The memory 2050 can also store other software instructions (not shown), such as web video instructions to facilitate web video-related processes and functions; and/or web shopping instructions to facilitate web shopping-related processes and functions. In some implementations, the media processing instructions 2066 are divided into audio processing instructions and video processing instructions to facilitate audio processing-related processes and functions and video processing-related processes and functions, respectively. An activation record and International Mobile Equipment Identity (IMEI) 2074 or similar hardware identifier can also be stored in memory 2050.

Each of the above identified instructions and applications can correspond to a set of instructions for performing one or more functions described above. These instructions need not be implemented as separate software programs, procedures, or modules. The memory 2050 can include additional instructions or fewer instructions. Furthermore, various functions of the computing device 2000 can be implemented in hardware and/or in software, including in one or more signal processing and/or application specific integrated circuits.

What is claimed is:

1. A method comprising:
   presenting a map display and a route on a mobile device;
   monitoring a current location of the mobile device as the mobile device moves along the route;
   determining that the current location of the mobile device corresponds to a location near the end of the route;
   in response to the determination, displaying a prompt for input rating the route; and
   receiving user input comprising rating information for the route.

2. The method of claim 1, wherein the input comprises a selection of a binary rating.

3. The method of claim 1, wherein the input comprises a selection of a value on a rating scale.

4. The method of claim 1, wherein the input comprises a selection of one or more characteristics to associate with the route.

5. The method of claim 1, wherein the input comprises textual input describing the route.

6. The method of claim 1, further comprising:
   transmitting the rating information to a navigation service, where the navigation service generates routes based on user-specified rating information.

7. The method of claim 1, further comprising:
   receiving route information describing the route, where the route information was generated by a navigation service that generates routes based on user-specified rating information.

8. A non-transitory computer-readable medium including one or more sequences of instructions which, when executed by one or more processors, causes:
   presenting a map display and a route on a mobile device;
   monitoring a current location of the mobile device as the mobile device moves along the route;
   determining that the current location of the mobile device corresponds to a location near the end of the route;
   in response to the determination, displaying a prompt for input rating the route; and
   receiving user input comprising rating information for the route.

9. The computer-readable medium of claim 8, wherein the input comprises a selection of a binary rating.

10. The computer-readable medium of claim 8, wherein the input comprises a selection of a value on a rating scale.

11. The computer-readable medium of claim 8, wherein the input comprises a selection of one or more characteristics to associate with the route.

12. The computer-readable medium of claim 8, wherein the input comprises textual input describing the route.

13. The computer-readable medium of claim 8, wherein the instructions cause:
   transmitting the rating information to a navigation service, where the navigation service generates routes based on user-specified rating information.

14. The computer-readable medium of claim 8, wherein the instructions cause:
   receiving route information describing the route, where the route information was generated by a navigation service that generates routes based on user-specified rating information.

15. A system comprising:
   one or more processors; and
   a computer-readable medium including one or more sequences of instructions which, when executed by the one or more processors, causes:
      presenting a map display and a route on the system;
      monitoring a current location of the system as the system moves along the route;
      determining that the current location of the system corresponds to a location the end of the route;
      in response to the determination, displaying a prompt for input rating the route; and
      receiving user input comprising rating information for the route.

16. The system of claim 15, wherein the input comprises a selection of a binary rating.

17. The system of claim 15, wherein the input comprises a selection of a value on a rating scale.

18. The system of claim 15, wherein the input comprises a selection of one or more characteristics to associate with the route.

19. The system of claim 15, wherein the input comprises textual input describing the route.

20. The system of claim 15, wherein the instructions cause:
   transmitting the rating information to a navigation service, where the navigation service generates routes based on user-specified rating information.

21. The system of claim 15, wherein the instructions cause:
   receiving route information describing the route, where the route information was generated by a navigation service that generates routes based on user-specified rating information.

* * * * *